Oct. 3, 1967   J. D. STAGGS   3,344,691

CAM OPERATED WIRE STRIPPER

Filed Jan. 24, 1966   2 Sheets-Sheet 1

INVENTOR.
JESSE D. STAGGS
BY Samuel Lindenberg
ATTORNEY

Oct. 3, 1967          J. D. STAGGS          3,344,691
                 CAM OPERATED WIRE STRIPPER
Filed Jan. 24, 1966                    2 Sheets-Sheet 2
Fig. 4
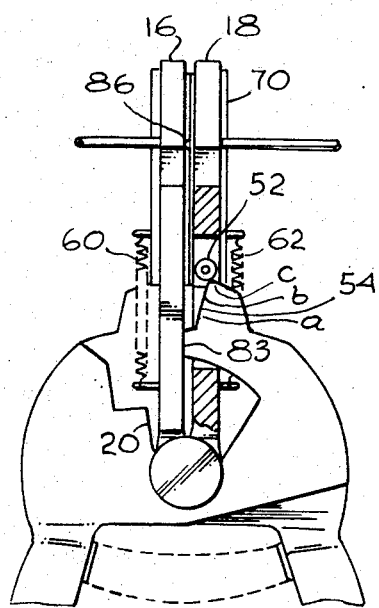
Fig. 5
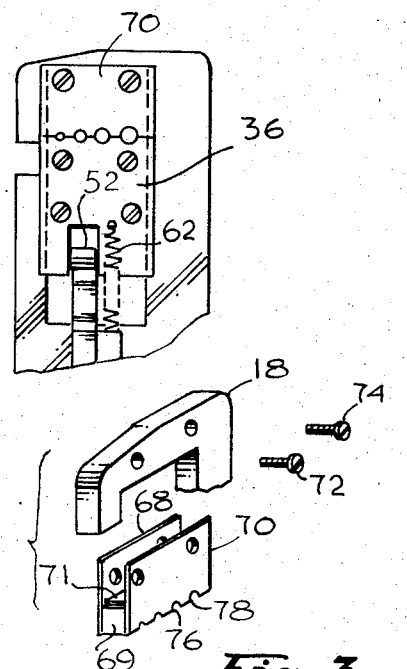
Fig. 3
Fig. 6
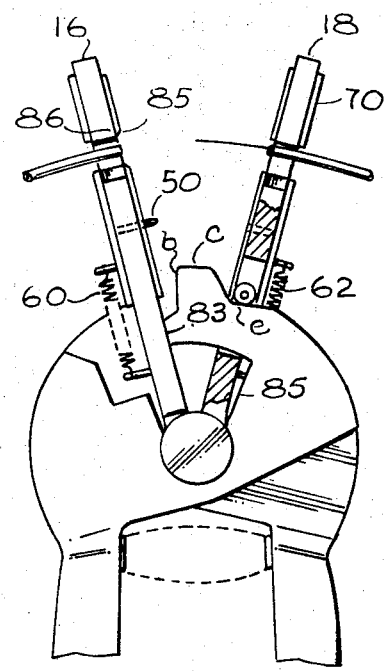
Fig. 7
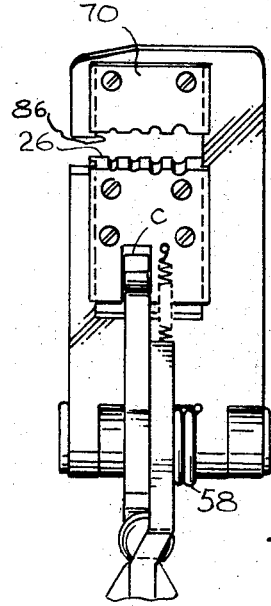
INVENTOR.
JESSE D. STAGGS
BY Samuel Lindenberg
ATTORNEY

United States Patent Office 3,344,691
Patented Oct. 3, 1967

3,344,691
CAM OPERATED WIRE STRIPPER
Jesse D. Staggs, 620 N. Florence,
Burbank, Calif. 91505
Filed Jan. 24, 1966, Ser. No. 522,744
14 Claims. (Cl. 81—9.5)

ABSTRACT OF THE DISCLOSURE

A hand-operated tool for cutting and stripping insulation from a wire. The tool includes an open cutting means and an open clamping means which can be closed by exerting pressure on a pair of handles. Once the cutting means has bottomed to fully cut through the insulation, the clamping means and cutting means separate to thus strip the insulation off the wire. Cam means are included for closing both the clamping means and cutting means and for preventing separation of these means until the insulation has been fully cut through.

---

This invention relates to apparatus employed for stripping insulation from wires, and more particularly to improvements therein.

In industries, such as the aerospace industry, there are stringent requirements regarding wires which have been stripped. The intended portion must be stripped entirely free of insulating material yet no nicking, scraping nor any damage whatsoever to the conductor, as a result of stripping, is permitted. A commonly-used wire in the areospace industry is one which has a primary insulation (usually vinyl) covered with a glass braid and a nylon jacket. The types of wire strippers which are used to strip this wire are minor adaptions from cruder forms of wire strippers used for house wiring or for general industrial use where insulation is soft, and the process whereby the insulation is removed is not rigidly controlled. Thousands of wires in aerospace assemblies must be stripped and terminated. Therefore, it will be appreciated that a wire stripping tool which performs the stripping operation without nicking or damaging the conductor and without requiring an operator to hand trim the stripped wire in order to get rid of fibers of insulating material remaining in the stripped area, as a result of the use of the presently-available strippers, can save a considerable amount of time and money. Attempts heretofore to remove all fibers remaining after stripping by making the stripper blades sharper have only resulted in more conductors being nicked or scraped.

An object of this invention is the provision of a novel cam operated wire stripper.

Another object of this invention is the provision of a wire stripper which eliminates any strands of insulating material remaining after the stripping operation.

Yet another object of the present invention is the provision of a construction for a wire stripper which provides an improved stripping operation, and result.

These and other objects of the present invention are achieved by the provision of a wire stripper which first cuts insulation of a wire and thereafter pulls it off the wire, instead of simultaneouly cutting and pulling the insulation as is done in the presently-employed wire strippers. The operation of cutting is under the control of a cam and cam follower which provides the required cutting operation when needed. The stripper blades which do the actual cutting are given a bevel cut and the adjacent areas of the carriage which holds the blade is given a chamfer cut so that the insulation of the wire which is being cut is not deformed in the regions adjacent to the blade, preventing proper cutting, as happens with the presently-available strippers.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 3 is an exploded perspective view showing the details of the assembly in the top of a guide;

FIGURES 4 and 5 are front and side views showing the location of the carriages and cam of the wire stripper at the time that the cutting operation has been performed;

FIGURES 6 and 7 show front and side views of the wire stripper at the time that the insulation stripping operation is performed;

Figure 1:
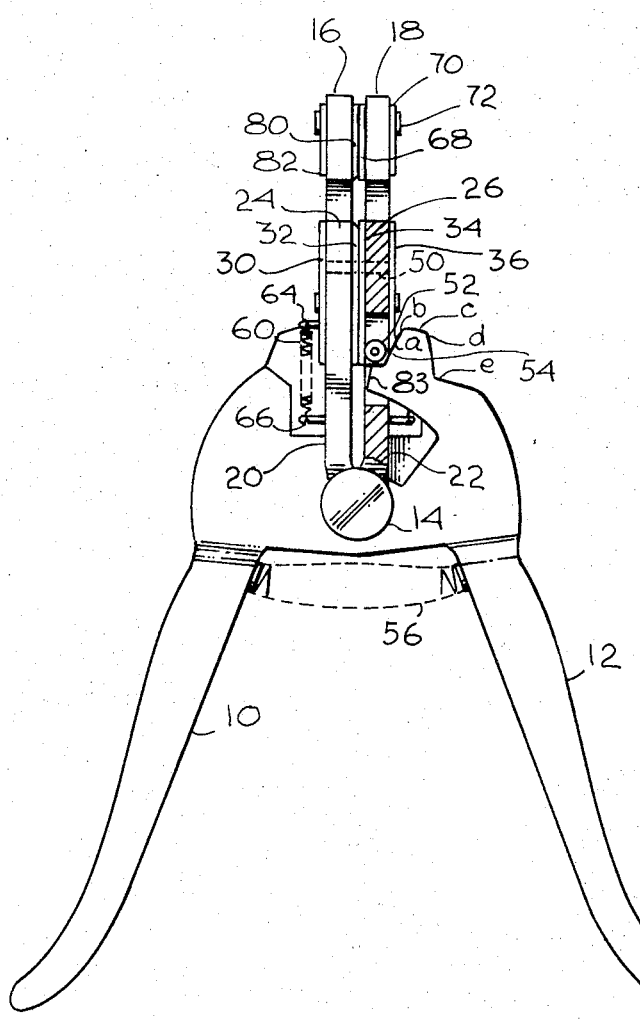
FIGURE 1 is a front view of a wire stripper in accordance with this invention, illustrating its appearance before attempting to strip wire.
Figure 2:
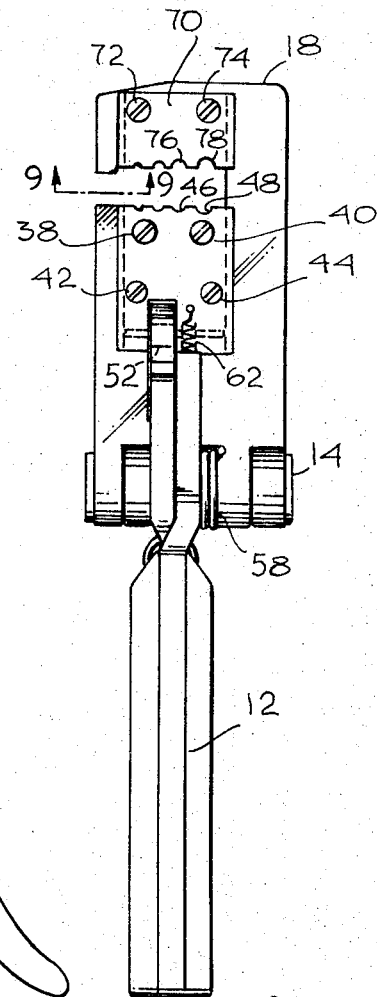
FIGURE 2 is a side view of an embodiment of this invention.

Attention is now directed to FIGURES 1 and 2 which are respectively front and side views of a wire stripper in accordance with this invention. The wire stripper structure is essentially symmetrical so that whatever structure is described for one side exists on the other. The wire stripper comprises the usual pair of handles 10, 12 which are identical, and which are supported for pivoting about a pivot pin 14. Also pivotably mounted on the pivot pin are two guides respectively 16, 18. These guides extend in a plane parallel to the vertical center line passing through the axis of the pivot pin 14. When the handles 10, 12 are in the closed position, the guides are also held in the closed position; that is, in adjacent contact with one another, by the surfaces 20, 22 of the handles. The guides have a central elongated, substantially rectangular opening cut in them within which the carriages respectively 24, 26 may be slidably mounted. An opening is cut through the wall at one side of the guide defining this rectangular opening to enable the wires which are to be stripped to be inserted into and to be removed from the wire stripper.

The manner of mounting the carriages 24, 26 slidably on the guides is to provide carriage 24 with a plate 30 and a plate-like blade 32, and to provide carriage 26 with two plates respectively 34, 36. The plates and the plate-like blade are oversized as far as the central rectangular opening in the guide is concerned and are attached to the respective carriages as by screws 38, 40, 42, 44, whereby the carriages are slidably supported within the rectangular openings of the respective guides 16, 18. The plates, plate-like blade and carriages 24, 26 all have aligned grooves 46, 48, for example, as may be seen in FIGURE 2. These grooves which are of different sizes, are for the purpose of holding the insulation of the various wire sizes for stripping.

In order to insure that the carriages slidably move together, a pin 50, represented by the dotted lines in FIGURES 1 and 2, is fixed in one of the carriages 24 and the other carriage has a hole therein in which the pin can be removably inserted.

Near the bottom of each carriage and the outer plate, there is a rectangular cutout and a cam follower 52 is mounted therein. The top end of each handle is provided with a cam 54 having cam surfaces a, b, c, d, such that as the handles 10, 12 are squeezed toward one another, the cam follower will ride up the steep slope a of the cam surface, over the point b of the cam surface, over the surfaces c and d, finally coming to rest at point e. It should be noted that there is a compression spring 56 which tends to restore the handles 10, 12 to the position shown in FIGURE 1 and in addition a torque spring 58 which also tends to maintain the guides in the position shown whereby they abut one another. The two carriages tend to be brought to the position shown in FIGURE 1 by two springs respectively 60, 62 which extend between a pin 64 in the carriage 24, for example, and a pin 66 in the guide 16, for example.

As may be seen in FIGURE 3, the top portion of the guide 18 has two plates respectively 68, 70, which have the same thicknesses as the two plates 34, 36 and which are attached to the guide as by screws 72, 74. The plates 68 and 70 are spaced apart by a spacer 69, to which they may be welded. The plates and spacer 68 and 70 have different sized grooves therein, for example 76, 78 for holding the top half of the wire insulation, these grooves being opposed by the notches 46, 48 in the lower plates. One or more shims 71 are inserted between the base of the spacer 69 and the guide 18 to enable adjustment for manufacturing tolerances as well as for wear. The openings in the plates 70 are oversized to enable adjustment of this assembly after it has been mounted in the top portion of the guide.

A blade 80 is mounted on the inner and top surface of the guide 16 and opposes the plate-like blade 32 for cutting wire insulation. A plate 82 is mounted on the outer surface of the guide 16. The detail of the cutting blades will be hereinafter described.

Attention is now directed to FIGURES 4, 5, 6 and 7, as well as to FIGURES 1 and 2 which show the positions of the carriages and the handles during the various stages of the wire stripping process. Assume now, that at the outset a wire is placed within the opening of the guides and is bottomed in one of the grooves in the guides and plates which provide a diameter generally equivalent to that of the wire to be stripped. It should be noted that the operation of the wire stripper is basically symmetrical so that while reference is made in the explanation to only one side of the axis of symmetry, it should be understood that this applies to both sides.

When the handles are moved toward the center line, the cam 54 will also move toward the center line and the surface a of the cam will cause the cam follower 52 and the carriage assembly 26, 34, 36 to move upward toward the top end of the opening in the guide. The inner surfaces of the carriage assembly (comprising the plates 32 and 34) and plates 68 and 80 are in contact at the center line. The contact of the carriages at the center line provides a means of balancing and neutralizing undesirable side force components introduced by the action of the cam against the cam follower. If these side loads were not cancelled out, the carriage assembly would be forced against the guides 16, 18, thus causing sliding friction. This sliding friction would require a lesser slope a on the cam than is made possible by the "force balancing" means described.

A hand operated wire stripper must perform one complete cycle using the limited stroke and pressure of the operator's hand. Due to the extremely small amount of friction, as described previously, an energy savings is realized and taken advantage of by using a steep slope a, of the cam 54. This, in combination with the other components of the wire stripper, makes it possible to have rapid travel of the carriages 24, 26, where the loads are light, and a great lever advantage where high closing pressure against the insulation is required. This gives optimum utilization of a manually operated handle travel, minimizing operator effort.

As the cam follower moves up slope a of the cam, it is seen that a rapid closing of the carriage results from a small handle movement, thus conserving handle travel. This condition of light load and rapid travel continues until the cam follower reaches the point b of the cam 54, where resistance to travel due to compression of the insulation to be stripped is met. Between point b and point c on the cam, the slope of the cam reduces to increase the force closing the carriages. The position of the carriages when the cam follower is on point c is shown in FIGURES 4 and 5. With the lever advantage between the handles and cam, plus the slope of the cam, the strength of the apparatus becomes the only factor preventing infinite closing pressure against the wire. It will be appreciated that in view of the cam and cam follower operation, a variable lever advantage is made available which provides the closing pressure when it is needed. This has not been available in wire strippers heretofore.

It should be noted that there is no force separating or pulling apart the carriages which contain the stripping blades during the carriage closing cycle. The stripper blades bottom before any stripping force is applied. In the presently-available hand wire strippers, the pulling apart tension is applied to the stripper blades as soon as the blades engage the outer surfaces of the insulation. This results in a tearing action which leaves unwanted insulation fibers on the wire.

When the cam follower 52 reaches slope c on the cam, the carriages and stripper blades are at the fully closed position on the wire, as may be seen in FIGURES 4 and 5. At this point, the surface 83 (on each handle) is rotated to a position to exert a force against the guide 16 which causes the guides to commence to open. The surface of the cam 54 is concentric about the wire stripper pivot axis from slope c to slope d. This dwell portion of the cam keeps the carriages in the closed position or position at the end of the rectangular opening within the guides, while the insulation is being stripped from the wire.

The retraction of the carriages at the end of the stripping stroke is caused by the moving of the cam follower along slope d and the final stopping place for the cam follower is at e, as may be seen in FIGURE 6. At any time after the cam follower reaches slope d, the stripped wire may be removed. The surface 85 of the handles acts as a stop limiting the maximum open position of the guide 18.

The operator now releases the handles whereupon compression spring 56 and torque spring 58 operate to restore the wire stripper to its initial position. Carriages 24 and 26 are pulled toward the retracted position by the operation of the springs 60 and 62. The torque spring 58 provides sufficient torque to overpower the pull of the springs 60 and 62 whereby the cam followers are held in contact with the respective cams. Accordingly, the cam followers reverse their travel back to their starting position at the foot of surface a of the cam. Surface 20 is the limiting stop for the handle against the guide in the starting position.

The upper and lower blades 32 and 80 are properly aligned for cutting the wire insulation by the provision of the surface 86 (shown in FIGURE 7) when the lower blade comes up to close on the upper blade, it will slide over the surface 86 which aligns it with the upper blade which is already attached to that surface. The guides also serve to prevent any lateral misalignment of the blades in the plane of the guides which may occur as a result of the forces being applied to move the carriages.

It was previously pointed out that attached to the upper portion of the guide 16 is the blade 80 and the outer plate 82 and attached to the carriage 24 is the plate-like blade 32 and the outer plate 30. While screws have been shown for holding these assemblies together, it will be appreciated that any other practical method, such as spot welding or brazing or riveting may be employed. A preferred arrangement is to rivet or spot weld the blade 32 to the carriage while the plate 32 is attached to the carriage by screws. The guide 18 and the plates attached thereto along with the carriage 26 and the plates attached thereto serves the function of holding the wire while the insulation is being cut and thereafter pulled from the wire. The difference in construction from the cutting side is merely in the provision of cutting blades on the cutting side.

Figure 8:
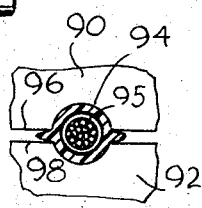
FIGURE 8 illustrates what happens to wire insulation with the present type of wire stripper during the cutting operation.

In FIGURE 8 there is shown the appearance of wire insulation during the cutting operation using presently-known types of wire strippers. The cutting blades (shown fragmentarily) 90, 92 are closing down on the insulation 94. There are flat portions 96, 98 adjacent the cutting portions of the blade 90, 92 which serve to compress the insulation 94 of the wire 95 causing it to expand and extrude between the blades in the manner shown. In view of the fact that modern high grade insulating materials are hard and tough, it should be appreciated that in view of the extrusions of the material between the flat surfaces adjacent the blades 94, 96, it is almost impossible to bring the blades completely together. If the blades are not brought completely together, when the carriages separate to pull the cut portion of the insulation off the wire, a tearing action occurs and unwanted insulation fibers are left on the stripped area of the wire.

Figure 9:
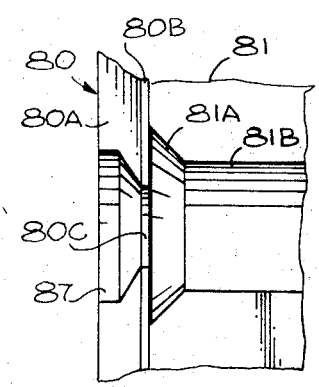
FIGURE 9 is a detail showing an enlarged section of a cutting blade, made in accordance with this invention.

FIGURE 9, comprising a section 9—9 of FIGURE 2, shows another feature of this invention which eliminates the aforementioned problem of extruding the outer insulation jacket and illustrates the appearance of the upper blade 80 and the spacer 81 which spaces it from the upper plate 82. All of the flat area adjacent the cutting edge of the blade is eliminated except for the width of the cutting edge 80B of the blade. As may be seen in FIGURE 9, from the flat surface 80A of the blade to its cutting edge 80B there is a bevel cut. Further there is a chamfer cut 81A in the spacer 81 to accommodate the insulation, to eliminate flat areas adjacent the cutting edge of the blade and to enable the blades to meet and sever the insulation while at the same time providing support for the insulation by means of the semicircular groove 87 in the blade 80 and the semicircular groove 81B. The insulation which lies in the semicircular grooves 87, 81B supports the wire symmetrically within the circular cutting edge 80C of the blade while the insulation is being cut and stripped.

Figure 10:
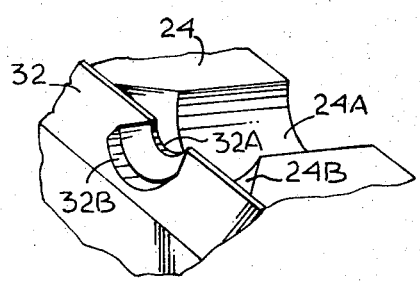
FIGURE 10 is a sectional detail view of the upper blade assembly.

FIGURE 10 is a view in perspective of a portion of the cutting edge of the blade 32 and the carriage 24. This perspective representation effectively has the same appearance as the upper blade 80. It shows the circular cutting edge 32A, the groove 32B in the blade, the groove 24A in the carriage, and the chamfer cut 24B in the carriage adjacent the cutting edge of the blade to provide room for the squeezed insulation during the cutting operation. Because of the two piece assembly of blade and carriage it is a simple matter to provide the operation whereby the chamfer cut is made in either spacer or carriage for providing a relief in the insulating jacket extruding area. It would be extremely difficult to remove this metal where the blade and adjacent structure is made of one piece.

From the foregoing description, it should be appreciated that a novel, useful and improved wire stripper has been described which eliminates cutting or nicking of wires and fibers of insulating material remaining after the stripping operation by virtue of first completing the cutting operation and thereafter the stripping operation, and further by the manner of the support of the wire during the cutting operation. The wire stripper, in accordance with this invention also provides a cam operation whereby the energy for performing the cutting function is provided when it is needed. While this invention is described as a hand operation apparatus, it should be apparent that it may also be power operated.

What is claimed is:

1. Means for cutting and stripping insulation from wire comprising first and second carriage means, cam means for moving said first and second carriage means adjacent and parallel to one another from one end to the other end of a predetermined travel path, first and second opposing means positioned for abutting said respective first and second carriage means at the other end of said travel path, first blade means carried by said first opposing means, second blade means carried by said first carriage means for cooperating with said first blade means for cutting the insulation of an insulated wire placed between said first and second blade means at said other end of said path of travel, said second opposing means and said second carriage each having groove means for holding a wire placed between said first and second carriage means and said first and second opposing means, means for separating said first and second carriage means and said first and second opposing means in a direction transverse to said predetermined travel path, said cam means preventing said separation until after said first and second carriage means have reached said opposite end of said travel path, means for restoring said first and second carriage means to their position adjacent one another, and means for returning said first and second carriage means to their positions at one end of said path.

2. Means for cutting and stripping wire as recited in claim 1 wherein said first carriage means has an opening therein, said second carriage means has a pin means mounted thereon for removable insertion into said opening in said first carriage means during motion along said predetermined travel path to insure substantially simultaneous movement of said first and second carriage means along said predetermined travel path.

3. Means for cutting and stripping wire as recited in claim 1 wherein the edges of each of said first and second blade means which oppose one another are beveled, each beveled edge has a grooved, narrower insulating cutting edge therein, the size of the groove being determined to provide clearance of the wire diameter within an insulated wire to be cut.

4. Apparatus for stripping insulation from a wire comprising a first and second guide means, pivot means for pivotably supporting said guide means adjacent one another, each said guide means having walls defining aligned elongated openings through said respective first and second guide means, an access opening through each of said walls positioned to permit access near to an end of said elongated openings, a first and a second carriage means reciprocally slidable within said first and second elongated openings, first and second cam means for respectively moving said first and second carriage means together from one end of said elongated opening toward the other end of said elongated opening, each said access opening being positioned near said other end of each said elongated opening, first and second opposing means mounted within said other end of said respective elongated openings for opposing said first and second carriage means at the other end of said elongated opening, first blade means carried by said first carriage means, second blade means carried by said first opposing means for cooperating with said first blade means for cutting the insulation of an insulated wire placed into said elongated opening at said one end, said second carriage means and said second opposing means having grooves therein for cooperating in holding a wire placed in said grooves for having its insulation cut and removed, means for separating said first and second guide means and carriage means after said first and second carriage means have been moved to abut said first and second opposing means at said one end of said elongated opening by said first and second cam means, first resilient means for restoring said first and second guide means and carriage means to their position in contact with one another, said second resilient means for returning said first and second carriage means to their positions at said other ends of said first and second elongated openings.

5. Apparatus for stripping insulation from a wire as recited in claim 4 wherein said first carriage means has an opening therein, said second carriage means has a pin means mounted thereon for removable insertion into said opening in said first carriage means during motion along said predetermined travel path to insure substantially simultaneous movement of said first and second carriage means along said predetermined travel path.

6. Apparatus as recited in claim 4 wherein said cam means comprises on each said first and second carriage means a cam follower, means establishing a first and second handle respectively extending from adjacent said first and second guide means, means on said first and second handle means providing a respective first and second cam surface positioned for being followed respectively by said first and second cam followers, each said cam surface having a first steep portion movement of a cam follower over which urges said associated carriage means quickly toward the other end of elongated openings, each said cam surface having a second portion less steep relative to said first portion movement of a cam follower over which moves said associated carriage means into an abutting position with said first and second opposing means at the other end of said elongated opening, each said cam surface having a dwell portion motion of said cam follower over which maintains the previous position of said carriage, and each said cam surface having a fourth portion motion of said cam follower over which enables said first and second carriage means to move away from said other ends of said elongated openings to enable removal of wire from between said carriage means and opposing means.

7. Apparatus as recited in claim 4 wherein said first and second carriage means are smaller than the elongated openings of said first and second guide means and there is included a first and second flat plate wider than said elongated opening, means attaching said first and second flat plate on opposite sides of said second carriage means for slidably holding it within said elongated opening in said first guide means, a third flat plate wider than said elongated opening, said first blade means having the shape of a flat plate wider than said elongated opening, means attaching said blade and said third flat plate on opposite sides of said first carriage means for slidably holding it within said elongated opening.

8. Apparatus as recited in claim 7 wherein the edges of said first blade means, said first carriage means and said third flat plate means which are opposite said first opposing means are in substantial alignment, said edge of said first blade means is beveled, said bevel extending away from said first carriage means, said first blade means having a cutting region at the beveled edge thereof which is grooved to provide clearance for the wire whose insulation is cut, said third flat plate of said first carriage having a groove therein sized to receive a wire whose insulation is to be removed, the grooves in said cutting region, said first carriage means and said third flat plate being aligned, said first carriage means having a chamfer cut adjacent the cutting region of said first blade to afford space for compressed insulation of a wire whose insulation is being cut.

9. Apparatus as recited in claim 4 wherein said first opposing means includes a first flat plate, a first spacer, said second blade means being in the form of a flat plate, means attaching said first flat plate and said second blade to opposite sides of said first spacer, with their edge surfaces aligned, said spacer width between said opposite sides being substantially equal to the width of said first guide means, and means fastening said second blade means and first flat plate to the sides of said first guide means to hold said second blade means with its edge opposite said first blade means edge and said first spacer means within the elongated opening within said first guide means, said second opposing means includes a second spacer having the same width as said second guide means, a second and third flat plate, means fastening said second and third flat plate to opposite sides of said second spacer, means attaching said second and third flat plates to the sides of said second guide means with said second spacer within the elongated opening therein.

10. Apparatus as recited in claim 9 wherein the edge of said second blade means is beveled, said bevel extending away from said first spacer, said second blade means having a cutting region at the beveled edge which is grooved to provide clearance for the wire whose insulation is cut, said first spacer and first flat plate having a groove aligned with the groove in said second blade means for receiving a wire whose insulation is to be cut, the region of said spacer adjacent the groove in said second blade means being chamfered to provide space for the compressed insulation of a wire whose insulation is being cut.

11. Apparatus as recited in claim 9 wherein shim means are inserted betwen said first and second spacers and said first and second guide means for adjusting the position of said first and second opposing means relative to said first and second carriage means.

12. A wire stripping tool comprising in combination:
an open means for clamping wire therebetween when closed;
an open means for cutting the insulation on a wire when closed, which is clamped by said means for clamping wire, said means for clamping and means for cutting being adjacent to each other;
means operative for moving said clamping means and said cutting means away from each other to strip insulation from said wire; and
means for closing said clamping means and said cutting means and for prohibiting premature movement of said clamping and cutting means away from each other.

13. A wire stripping tool as recited in claim 12 wherein:
said open means for clamping wire therebetween comprises a fixed clamping means;
an opposed movable clamping means;
said means for cutting the insulation on a wire clamped by said means for clamping wire comprises a fixed cutting blade means;
opposed movable cutting blade means;
said means for closing said means for clamping and said means for cutting includes cam means for moving said opposed movable clamping means into bottoming engagement with said fixed clamping means and
said opposed movable cutting blade means into bottoming engagement with said fixed cutting blade means.

14. A wire stripping tool as recited in claim 13 wherein said means for clamping wire therebetween further includes:
first support means for supporting said fixed clamping means and slidably supporting said opposed movable clamping means;
said means for cutting the insulation on a wire further includes second support means for supporting said fixed clamping means and slidably supporting said opposed movable cutting blade means;

said means operative for moving said means for clamping and said means for cutting away from each other includes means connected to said cam means for pushing said second support means away from said first support means after said cam means moves said opposed clamping means and opposed movable cutting blade into bottoming engagement with the respective fixed clamping means and fixed cutting blade means.

References Cited

UNITED STATES PATENTS

| | | | |
|---|---|---|---|
| 3,182,532 | 5/1965 | Ochlerking | 81—9.5 |
| 2,179,581 | 11/1939 | Voogd | 81—9.5 |
| 2,313,793 | 3/1943 | Wood | 81—9.5 |
| 3,125,909 | 3/1964 | Hindenburg | 81—9.5 |

MILTON S. MEHR, *Primary Examiner.*